United States Patent
Strassheimer

[11] 3,987,705
[45] Oct. 26, 1976

[54] DEVICE FOR OPENING AND CLOSING A MOLD IN A MOLDING MACHINE

[75] Inventor: Herbert Strassheimer, Bischofsheim, Germany

[73] Assignee: GNK Windsor G.m.b.H., Bischofsheim, Germany

[22] Filed: Oct. 11, 1974

[21] Appl. No.: 514,285

[30] Foreign Application Priority Data
Oct. 12, 1973   Germany............................ 2351222

[52] U.S. Cl.................................... 91/416; 92/248
[51] Int. Cl.²....................... F15B 15/17; F16J 9/00
[58] Field of Search ................ 91/416; 92/252, 248, 92/249

[56] References Cited
UNITED STATES PATENTS

| | | | |
|---|---|---|---|
| 3,139,008 | 6/1964 | Haanes | 91/416 |
| 3,312,150 | 4/1967 | Strader | 92/252 |
| 3,603,210 | 9/1971 | Floryancic | 91/416 |

*Primary Examiner*—Paul E. Maslousky
*Attorney, Agent, or Firm*—Michael J. Striker

[57] ABSTRACT

A differential piston is reciprocable in a cylinder and subdivides the latter into a first and a second chamber. The piston has a piston rod which extends through the second chamber outside the cylinder and is adapted to open and close the mold of a molding machine. An admitting conduit admits pressure fluid into the first chamber, and a connecting conduit connects the two chambers and has a valve interposed in it so that the two chambers communicate with one another only while the first chamber is pressurized, not while the second chamber is pressurized in the absence of pressure in the first chamber. A sealing arrangement between the piston and an inner circumferential surface of the cylinder is effective for preventing the flow of pressure fluid from the second to the first chamber when the latter is at a lower pressure than the former.

10 Claims, 4 Drawing Figures

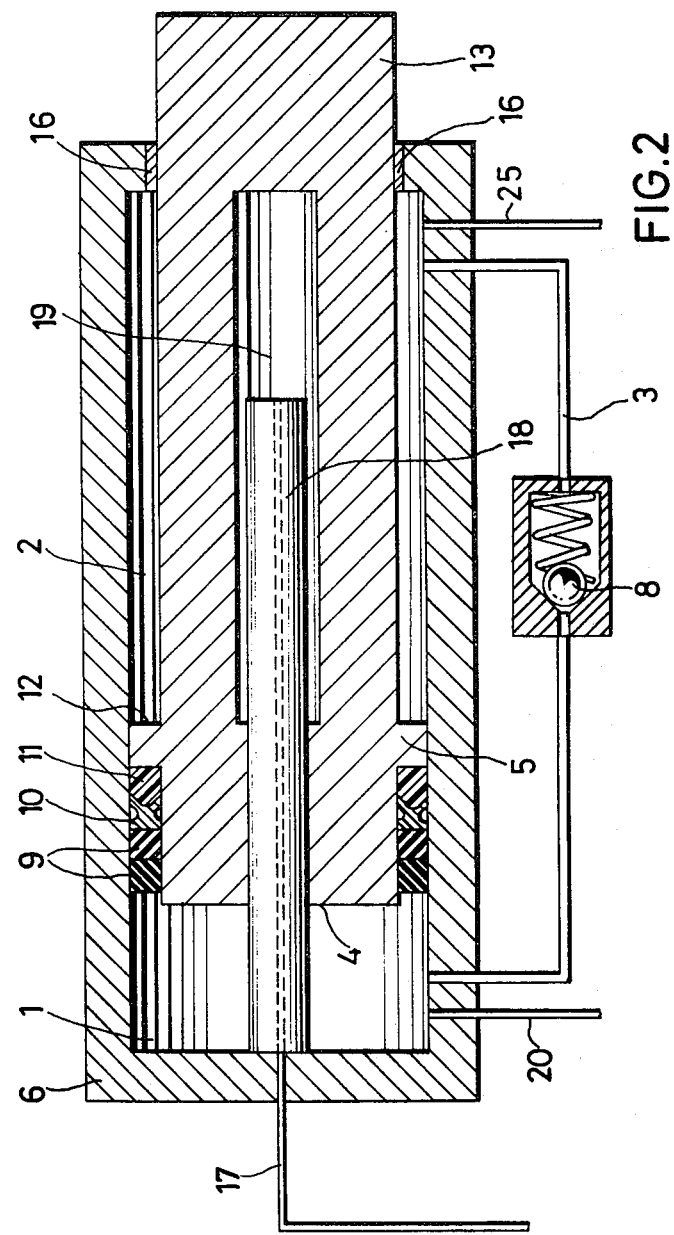

DEVICE FOR OPENING AND CLOSING A MOLD IN A MOLDING MACHINE

BACKGROUND OF THE INVENTION

The present invention relates generally to a molding machine, and more particularly to a molding machine having a novel device for opening and closing the mold.

In molding machnes, such as injection molding machines, devices must be provided for opening and closing the mold space. For this purpose it is known to provide a double-acting hydraulic cylinder and piston unit the piston rod of which extends out of the cylinder and moves the movable portion of the mold to or from closed position. In the conventional apparatuses of this type pressure fluid is admitted into the pressure space of the cylinder, to thereby move the piston and piston rod to a position in which the mold is closed and the movable component of the mold transmits — under the pressure exerted by the pressure fluid — a closing force to the mold. The force required for subsequently opening the mold when the molding operation is completed, is exerted by admitting pressure fluid into a chamber of the cylinder which is remote from the pressure chamber, that is the second chamber formed in the cylinder by the presense of the piston. Problems are, however, encountered in these prior-art constructions because it is necessary to provide two seals or packings which must seal the piston with respect to the two pressure chambers in the cylinder. Practical experience has shown that the packings used for this purpose are subject to particularly strong wear, which is disadvantageous for a variety of reasons. On the one hand, such packings are relatively complicated and quite expensive because they must provide for a sealing effect in both direcitons that is they must seal each chamber from the other chamber. On the other hand, it is relatively difficult to gain access to these packings for the purpose of replacing them with new ones when excessive wear has developed and this, in turn, means relatively long down-time for the entire machine, since the machine obviously cannot operate during the replacement of the packings. This is economically highly undesirable.

SUMMARY OF THE INVENTION

It is, accordingly, an object of the present invention to provide, in a molding machine, an improved device for opening and closing the mold which avoids the aforementioned disadvantages.

More particularly, it is an object of the invention ro provide such a device which assures that a particularly simple sealing element between the piston and the cylinder is capable of affording the necessary sealing action, while nevertheless permitting the device to operate at extremely high pressures on the order of 400 atmospheres or even higher.

Another object of the invention is to provide such a device wherein the sealing element used has an exceptionally long life and is subjected to little wear.

In keeping with these objects and with others which will become apparent hereafter, one feature of the invention resides in a molding machine and more particularly in a device in such a machine for opening and closing a mold. The device comprises, briefly stated, a cylinder and a differential piston reciprocable in the cylinder and subdividing the latter into a first and a second chamber. The piston has a piston rod which extends through the second chamber outside the cylinder and is adapted to open and close the mold. An admitting conduit is provided for admitting pressure fluid into the first chamber, and a connecting conduit connects the chambers and communicates them with one another only while the first chamber is pressurized. Sealing means is provided between the piston and an inner circumferential surface of the cylinder and is effective for preventing the flow of pressure fluid from the second to the first chamber when the latter is at a lower pressure than the former.

This construction has the significant advantage that the sealing means need provide a seal between the piston and the cylinder only in one direction, namely to prevent the flow of pressure fluid from the second chamber to the first chamber, whereas in the opposite direction from the first to the second chamber the flow of pressure fluid — such as oil — is permissible and need not be prevented by the sealing means. I have arrived at the novel construction which utilizes only a single seal, by realizing that the high wear of the two seals in the prior-art constructions results essentially from oil — i.e., pressure fluid — which becomes trapped between the two seals or packings and which then causes damage thereto. Since my novel construction uses only a single seal which seals only in one direction, namely in direction from the second to the first chamber, no such oil can become entrapped because the space which inherently exists in the prior art between the two seals, is avoided by my construction.

This eliminates the major source of wear of the seal or packing. Beyond this, however, my novel device has the further substantial advantage that the compensating pressure which is provided in the second chamber during closing of the mold also can be used to provide the impetus for movement of the piston to a position in which the mold becomes opened, so that a particularly rapid and reliable opening of the mold is assured with the device according to the present invention, without requiring separate instrumentalities for such opening movemennt.

A further advantage of my novel device resides in the fact that a particularly high force for movement of the mold to open position is available since, at the the very beginning of the movement towards open position, the full force required for such movement acts upon the piston. This means that the opening movement of the piston, i.e., the movement which displaces the movable component of the mold to open position, will reliably take place even if extremely high mold-closing pressures were previously utilized, and even where materials have been molded which inherently tend to offer a high resistance to the opening movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 2 is a somewhat diagrammatic axial section through a device according to the present invention;

DESCRIPTION OF THE PREFERRED EMBODIMENTS

Figures 1, 3, 4:
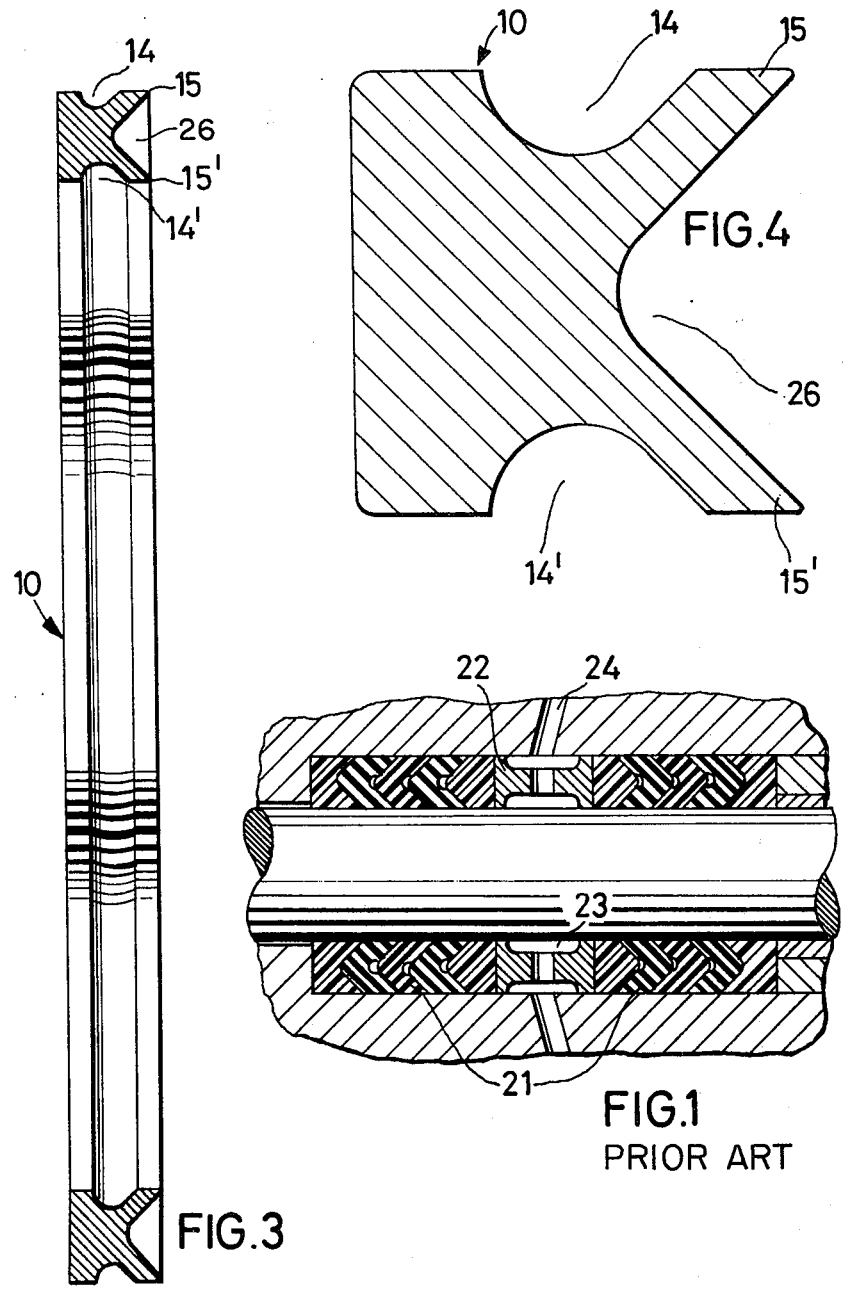
FIG. 1 is a fragmentary sectional detail view, illustrating a detail of the prior-art constructions whose disadvantages the present invention overcomes.
FIG. 3 is an axial section through a pressure ring of the packing used in FIG. 2.
FIG. 4 is a fragmentary cross-section, showing a detail of the pressure ring in FIG. 3 on an enlarged scale.

Referring now firstly to FIG. 1 it will be seen that this shows a detail of the prior-art, wherein an inner component such as a piston or a reciprocable piston rod is received in the fragmentarily shown outer component, such as a cylinder or the like. In such constructions the seal that is provided between the inner and outer component is in form of two sealing packings 21 each of which has a slide ring 22 which is formed with an annular groove 23 wherein the leakage oil can collect that tends to produce the excessive wear which has been previously mentioned. Such oil of course leaks past the packings 21 from one or the other chamber that is to be sealed. This oil is vented via the outlet 24, but only incompletely.

The present invention as disclosed by way of example in the embodiment of FIGS. 2 – 4 avoids all these difficulties of the prior art. Reference numeral 6 identifies a cylinder of my novel device for opening and closing a mold (not shown) of a molding machine, such as an injection molding machine. A piston 5 and its piston rod 13 are hydraulically reciprocable in the cylinder 6 and the end of the piston rod 13 which extends out of the cylinder 6 is connected with a movable component of the mold, which component is moved between a mold opening and a mold closing position in response to reciprocation of the piston 5. The latter is sealed with reference to the inner circumferential wall of the cylinder by a packing which is comosed of a pressure ring 10, a supporting ring 11 and two slide rings 9. For sealing the piston rod 13 with reference to the cylinder 6 a conventional piston rod packing 16 is utilized.

FIG. 2 shows the piston 5 in its retracted position, from which it must be moved towards the right to the mold closing position. For this purpose, hydraulic fluid under pressure is first admitted via a low-pressure fluid line 17, which passes centrally through a piston guide rod 13 that is fixedly mounted within the cylinder 6, into an interior space 19 in the piston. This causes the piston 5 to move at relatively high speed and relatively low pressure to the mold closing position. It does not, however, cause pressure to be exerted upon the mold-closing component in a sense maintaining the same in mold-closing position. For this purpose pressure fluid at high pressure is admitted via a high pressure fluid line 20 into the cylidner chamber 1, and I have found that pressures up to approximately 500 atmospheres can be utilized in my novel device. The pressure in the chamber 1 acts upon a piston end face 4, and the pressure is further transmitted via a fluid line 3, which communicates with the chamber 1, into the chamber 2 located at the opposite axial end of the piston 5. This means that the pressurized fluid from the chamber 1 can travel via the fluid line 3 and a one-way valve 8 interposed in the same into the chamber 2 so that the same pressure acts upon the annular piston face 12 which concentrically surrounds the piston rod 13, as acts upon the piston face 4. It is evident that the piston is a differential piston and that the force with which the piston presses the movable mold component into the mold-closing position thereof, will result from the surface area differential between the piston face 4 and the piston face 12.

In the embodiment which I have illustrated, the surface area of the piston face 12 corresponds to approximately 10% of the surface area of the piston face 4 upon which the closing pressure of approximately 500 atmospheres acts. This pressure is present both in chamber 1 and in the chamber 2 and there is therefore no reason for the packing composed of the elements 9, 10 and 11 to prevent the flow of pressure fluid from the chamber 1 into the chamber 2. On the contrary, it may even be desirable to allow the build up of as high as possible a compensation pressure in the chamber 2, in which case a flow of pressure fluid from the chamber 1 into the chamber 2 (essentially parallel to the flow of fluid through the fluid line 3) would only be beneficial. This means that the pressure ring 10 need not be pressed particularly firmly against the inner surface of the cylinder 6.

In the event that pressure fluid is present in the chamber 2 during the initial movememt of the piston 5 towards the right, that is while the piston 5 moves under the influence of low pressure fluid admitted via the fluid line 17, such pressure fluid can escape from the chamber 2 via an outlet conduit 25. The latter is advantageously controlled via a non-illustrated valve in such a manner that it opens as soon as piston 5 begins to move towards the right but closes as soon as the pressure of fluid admitted via the fluid line 20 becomes effective.

When the mold is subsequently to be opened, no separate instrumentalities are required for this purpose. It is merely necessary to vent the chamber 1 because due to the high pressure of fluid present in the chamber 2 a force will act upon the annular piston face 12 which is sufficiently great to reliably and very rapidly move the piston 5 towards the left, thereby opening the mold. During this operation, sealing lips 15, 15' of the pressure ring 10 (to be described in more detail with reference to FIGS. 3 and 4) will tightly sealingly engage the inner circumferential surface of the cylinder 6, so that initially — that is upon disappearance of the pressure in the chamber 1 — the pressure in the chamber 2 will be fully maintained. This means that, at the very beginning of the movement towards opening position, the full pressure required for the opening movement is available, and the pressure in the chamber 2 will drop only as the piston 5 moves towards the left, proportionately to the length of the path traversed by the piston. Of course, the initial very high pressure in the chamber 2 will be maintained only briefly while the piston 5 travels through a small distance towards the left and will then rapidly begin to drop; however, this time is long enough to assure a reliable opening of the mold against all obstacles that are encountered.

The fact that the piston 5 moves only through a small distance under extremely high pressure is highly advantageous in terms of obtaining an improved life for the pressure ring 10. It is clear that, as set out earlier, a sealing effect on the part of the pressure ring 10 in combination with the slide rings 9 and supporting rings 11 is required only in the sense of sealing in one direction, namely against the flow of pressure fluid from the chamber 2 into the chamber 1, but not in the opposite direction. Moreover, the piston travels only through a small distance while the packing is subjected to extremely high pressure, and travels the rest of the way while the packing is subjected to much lower pressure. Both of these factors significantly contribute to a substantial reduction in the wear of the packing composed of the elements 9, 10 and 11.

Details of the pressure ring 10 are shown on an enlarged scale in FIGS. 3 and 4. It will be seen that the pressure ring 10, which is advantageously but not necessarily of centrifugally cast bronze, is formed on its outer and inner circumferential surfaces with respective annular grooves 14 and 14'. In one axial end face it is also formed with a circumferential groove 26 of V-shaped cross-section, so that the ring has inclined radially projecting sealing lips 15, 15'. This construction provides for a particularly good seal in the one direction in which a seal is required, namely from the chamber 2 towards the chamber 1, because these sealing lips elastically engage the respective components to be sealed and thus assure that during the leftward movement of the piston 5 the full pressure in the chamber 2 with respect to the de-pressurized chamber 1 will remain for at least a brief period of time, since the supporting ring 11 which extends into the recess 26 (see FIG. 2) is hydraulically pressed against the sealing lips 15, 15' and in turn presses these against the cylinder 6 and piston 5, respectively.

The pressure ring 10 could also be an O-ring, and the glide rings may themselves be of bronze or may be made of Teflon.

It will be understood that each of the elements described above, or two or more together, may also find a useful application in other types of constructions differing from the types described above.

While the invention has been illustrated and described as embodied in a device for opening and closing a mold in a molding machine, it is not intended to be limited to the details shown since various modifications and structural chanbes may be made without departing in any way from the spirit of the present invention.

Without further anlaysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a molding machine, a hydraulic mold-operating device comprising a cylinder having an axis and an internal surface parallel to said axis and circumferentially bounding a space; a differential piston mounted in said space for axial reciprocation relative to said cylinder and subdividing said space into a first and a second chamber, said piston having an external surface parallel to said internal surface of said cylinder and a piston rod extending through said second chamber to the outside of said cylinder, means for admitting pressure fluid into and discharging the same from said first chamber so as to control the amount and pressure of said fluid in said first chamber; means for establishing communication between said chamber, including a communicating conduit through which said fluid flows from said first into said second chamber when the pressure in the former exceeds that in the latter; and means for interrupting communication between said chambers when the pressure in said second chamber exceeds that in said first chamber, including a one-way valve in said communicating conduit, and sealaing means interposed between said external surface of said piston and said internal surface of said cylinder, said sealing means including at least one deflectable sealing lip portion which is deflected into fluid-tight contact with one of said surfaces when said second chamber contains said fluid at a higher pressure than said first chamber by the action of such higher-pressure fluid, while said sealing lip portion permits said fluid to seep between the same and said one surface from said first into said second chamber when the former contains said fluid at a higher pressure than the latter.

2. A device as defined in claim 1, said piston having an end face exposed in said first chamber, and said piston rod having a cross-sectional area which equals substantially 90% of the area of said surface.

3. A device as defined in claim 1, wherein said admitting means is adapted for connection to a source of pressure fluid adapted to exert substantially 500 atmospheres of pressure upon said piston.

4. A device as defined in claim 1, wherein said sealing means comprises at least one slide ring, one pressure ring and one supporting ring.

5. A device as defined in claim 4, wherein said slide ring faces said first chamber and said supporting ring faces said second chamber, said pressure ring being located between said slide and supporting rings.

6. A device as defined in claim 5, wherein said pressure ring is of bronze.

7. A device as defined in claim 5, wherein said pressure ring has said sealing lip portion.

8. A device as defined in claim 7, wherein said pressure ring has another sealing lip portion similar to said sealing lip portion and deflectable into fluid-tight contact with the other of said surfaces.

9. A device as defined in claim 8, wherein said pressure ring has an outer and an inner circumferential surface each formed with an annular groove, and an axial end face formed with another circumferential groove, so that said pressure ring has axially inclined and radially projecting inner and outer annular ones of said sealing lip portions which engage said piston and said cylinder, respectively.

10. A device as defined in claim 9, wherein said supporting ring has an annular bulge at the axial side thereof which faces said pressure ring, said bulge being received in said groove of said pressure ring.

* * * * *

UNITED STATES PATENT AND TRADEMARK OFFICE
CERTIFICATE OF CORRECTION

PATENT NO. : 3,987,705
DATED : October 26, 1976
INVENTOR(S) : Herbert Strassheimer It is certified that error appears in the above-identified patent and that said Letters Patent are hereby corrected as shown below:

[73] The name of the assignee should read

GKN Windsor GmbH

Signed and Sealed this

Seventh Day of June 1977

[SEAL]

Attest:

RUTH C. MASON
*Attesting Officer*

C. MARSHALL DANN
*Commissioner of Patents and Trademarks*